(12) United States Patent
Edwards, Jr.

(10) Patent No.: US 6,766,479 B2
(45) Date of Patent: Jul. 20, 2004

(54) APPARATUS AND METHODS FOR IDENTIFYING BUS PROTOCOL VIOLATIONS

(75) Inventor: John W. Edwards, Jr., Clinton, MA (US)

(73) Assignee: Stratus Technologies Bermuda, Ltd., Hamilton (BM)

( * ) Notice: Subject to any disclaimer, the term of this patent is extended or adjusted under 35 U.S.C. 154(b) by 603 days.

(21) Appl. No.: 09/796,155

(22) Filed: Feb. 28, 2001

(65) Prior Publication Data

US 2002/0156954 A1 Oct. 24, 2002

(51) Int. Cl.⁷ .............................................. G06F 11/00
(52) U.S. Cl. ........................................ 714/43; 710/105
(58) Field of Search ................... 714/43, 56; 710/105, 710/124, 117, 309, 314, 315

(56) References Cited

U.S. PATENT DOCUMENTS

| | | | |
|---|---|---|---|
| 3,544,973 A | 12/1970 | Borck, Jr. et al. | 340/172.5 |
| 3,548,176 A | 12/1970 | Shutler | 235/153 |
| 3,641,505 A | 2/1972 | Artz et al. | 340/172.5 |
| 3,710,324 A | 1/1973 | Cohen et al. | 340/172.5 |
| 3,736,566 A | 5/1973 | Anderson et al. | 340/172.5 |
| 3,795,901 A | 3/1974 | Boehm et al. | 340/172.5 |
| 3,805,039 A | 4/1974 | Stiffler | 235/153 AE |
| 3,820,079 A | 6/1974 | Bergh et al. | 340/172.5 |
| 3,840,861 A | 10/1974 | Amdahl et al. | 340/172.5 |
| 3,997,896 A | 12/1976 | Cassarino, Jr. et al. | 340/172.5 |
| 4,015,246 A | 3/1977 | Hopkins, Jr. et al. | 340/172.5 |
| 4,032,893 A | 6/1977 | Moran | 340/166 R |
| 4,059,736 A | 11/1977 | Perucca et al. | 179/175.2 R |
| 4,228,496 A | 10/1980 | Katzman et al. | 364/200 |
| 4,245,344 A | 1/1981 | Richter | 371/68 |
| 4,263,649 A | 4/1981 | Lapp, Jr. | 364/200 |
| 4,275,440 A | 6/1981 | Adams, Jr. et al. | 364/200 |
| 4,309,754 A | 1/1982 | Dinwiddie, Jr. | 364/200 |
| 4,366,535 A | 12/1982 | Cedolin et al. | 364/200 |
| 4,434,463 A | 2/1984 | Quinquis et al. | 364/200 |
| 4,449,182 A | 5/1984 | Rubinson et al. | 364/200 |
| 4,453,215 A | 6/1984 | Reid | 364/200 |
| 4,467,436 A | 8/1984 | Chance et al. | 364/513 |
| 4,484,273 A | 11/1984 | Stiffler et al. | 364/200 |

(List continued on next page.)

FOREIGN PATENT DOCUMENTS

| | | | | |
|---|---|---|---|---|
| EP | 0 301 499 A2 | 2/1989 | | G06F/11/16 |
| EP | 0 428 330 A2 | 5/1991 | | G06F/13/30 |
| EP | 0 475 005 B1 | 11/1995 | | G06F/15/16 |
| EP | 0 293 860 B1 | 2/1996 | | G06F/13/28 |
| EP | 0 390 567 B1 | 6/1999 | | H04L/29/06 |
| GB | 2 060 229 A2 | 4/1981 | | G06F/3/00 |

OTHER PUBLICATIONS

Foundation models, PCI, PCI–X and PCI–X 2.0 Verification solutions datasheet, www.transeda.com, pp. 1–3.

*Primary Examiner*—Scott Baderman
(74) *Attorney, Agent, or Firm*—Testa, Hurwitz & Thibeault, LLP

(57) ABSTRACT

Disclosed is a novel structure and process for detecting protocol errors on a communications bus. According to one aspect of the invention, a protocol error detector comprises a physical error detector, a sequential error detector, and a logical error detector, each detecting physical, sequential, and logical protocol violations, respectively, and signaling a bus transaction error when a protocol violation is detected. In one embodiment, the protocol error detector substantially simultaneously checks each bus transaction for physical, sequential, and logical protocol violations. In another embodiment, the protocol error detector signals a detected bus transaction protocol violation substantially coincident with the bus transaction.

33 Claims, 8 Drawing Sheets

U.S. PATENT DOCUMENTS

| | | | |
|---|---|---|---|
| 4,486,826 A | 12/1984 | Wolff et al. | 364/200 |
| 4,503,496 A | 3/1985 | Holzner et al. | 364/200 |
| 4,543,628 A | 9/1985 | Pomfret | 364/200 |
| 4,590,554 A | 5/1986 | Glazer et al. | 364/200 |
| 4,597,084 A | 6/1986 | Dynneson et al. | 371/51 |
| 4,608,631 A | 8/1986 | Stiffler et al. | 364/200 |
| 4,628,447 A | 12/1986 | Cartret et al. | 364/200 |
| 4,630,193 A | 12/1986 | Kris | 364/200 |
| 4,633,394 A | 12/1986 | Georgiou et al. | 364/200 |
| 4,654,857 A | 3/1987 | Samson et al. | 371/68 |
| 4,669,056 A | 5/1987 | Waldecker et al. | 364/900 |
| 4,669,079 A | 5/1987 | Blum | 370/85 |
| 4,700,292 A | 10/1987 | Campanini | 364/200 |
| 4,703,420 A | 10/1987 | Irwin | 364/200 |
| 4,750,177 A | 6/1988 | Hendrie et al. | 371/32 |
| 4,805,091 A | 2/1989 | Thiel et al. | 364/200 |
| 4,809,169 A | 2/1989 | Sfarti et al. | 364/200 |
| 4,816,990 A | 3/1989 | Williams | 364/200 |
| 4,827,409 A | 5/1989 | Dickson | 354/200 |
| 4,866,604 A | 9/1989 | Reid | 364/200 |
| 4,914,580 A | 4/1990 | Jensen et al. | 364/200 |
| 4,916,695 A | 4/1990 | Ossfeldt | 371/9.1 |
| 4,926,315 A | 5/1990 | Long et al. | 364/200 |
| 4,931,922 A | 6/1990 | Baty et al. | 364/200 |
| 4,939,643 A | 7/1990 | Long et al. | 364/200 |
| 4,974,144 A | 11/1990 | Long et al. | 364/200 |
| 4,974,150 A | 11/1990 | Long et al. | 364/200 |
| 4,985,830 A | 1/1991 | Atac et al. | 364/200 |
| 4,994,960 A | 2/1991 | Tuchler et al. | 364/200 |
| 5,083,258 A | 1/1992 | Yamasaki | 395/725 |
| 5,117,486 A | 5/1992 | Clark et al. | 395/250 |
| 5,138,257 A | 8/1992 | Katsura | 324/158 R |
| 5,179,663 A | 1/1993 | Iimura | 395/250 |
| 5,243,704 A | 9/1993 | Baty et al. | 395/325 |
| 5,247,522 A | 9/1993 | Reiff | 371/29.5 |
| 5,251,303 A | 10/1993 | Fogg, Jr. et al. | 395/275 |
| 5,270,699 A | 12/1993 | Signaigo et al. | 340/825.01 |
| 5,287,463 A * | 2/1994 | Frame et al. | 710/105 |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,428,766 A | 6/1995 | Seaman | 395/575 |
| 5,463,755 A | 10/1995 | Dumarot et al. | 395/475 |
| 5,465,340 A | 11/1995 | Creedon et al. | 395/846 |
| 5,537,535 A | 7/1996 | Maruyama et al. | 395/183.01 |
| 5,550,986 A | 8/1996 | DuLac | 395/280 |
| 5,550,988 A * | 8/1996 | Sarangdhar et al. | 710/113 |
| 5,555,372 A | 9/1996 | Tetreault et al. | 395/182.13 |
| 5,572,685 A | 11/1996 | Fisher et al. | |
| 5,572,703 A * | 11/1996 | MacWilliams et al. | 711/146 |
| 5,574,865 A | 11/1996 | Hashemi | 395/283 |
| 5,584,030 A | 12/1996 | Husak et al. | 395/750 |
| 5,600,784 A | 2/1997 | Bissett et al. | 395/182.1 |
| 5,613,162 A | 3/1997 | Kabenjian | 395/842 |
| 5,627,965 A | 5/1997 | Liddell et al. | 395/185.01 |
| 5,630,056 A | 5/1997 | Horvath et al. | 395/185.09 |
| 5,659,681 A | 8/1997 | Ojima | 395/183.19 |
| 5,671,443 A | 9/1997 | Stauffer et al. | 395/845 |
| 5,696,905 A | 12/1997 | Reimer et al. | 395/227 |
| 5,701,410 A | 12/1997 | BeMent et al. | 395/183.19 |
| 5,701,457 A | 12/1997 | Fujiwara | 395/608 |
| 5,737,601 A | 4/1998 | Jain et al. | 395/617 |
| 5,751,955 A | 5/1998 | Sonnier et al. | 395/200.19 |
| 5,758,065 A | 5/1998 | Reams et al. | 395/185.01 |
| 5,784,576 A | 7/1998 | Guthrie et al. | |
| 5,809,256 A | 9/1998 | Najemy | 395/283 |
| 5,812,748 A | 9/1998 | Ohran et al. | 395/182.02 |
| 5,815,647 A | 9/1998 | Buckland et al. | 395/182.01 |
| 5,828,903 A | 10/1998 | Sethuram et al. | 395/817 |
| 5,838,899 A | 11/1998 | Leavitt et al. | 395/185.09 |
| 5,838,900 A | 11/1998 | Horvath et al. | 395/185.09 |
| 5,838,993 A | 11/1998 | Riley et al. | 395/842 |
| 5,862,145 A | 1/1999 | Grossman et al. | 371/5.1 |
| 5,875,308 A | 2/1999 | Egan et al. | 395/283 |
| 5,875,351 A | 2/1999 | Riley | 395/842 |
| 5,881,251 A | 3/1999 | Fung et al. | 395/283 |
| 5,892,928 A | 4/1999 | Wallach et al. | 395/283 |
| 5,894,560 A | 4/1999 | Carmichael et al. | 395/845 |
| 5,928,339 A | 7/1999 | Nishikawa | 710/26 |
| 5,944,800 A | 8/1999 | Mattheis et al. | 710/23 |
| 5,951,661 A * | 9/1999 | Tavallaei et al. | 710/105 |
| 5,953,538 A | 9/1999 | Duncan et al. | 395/842 |
| 5,956,476 A | 9/1999 | Ranson et al. | 395/183.06 |
| 5,978,866 A | 11/1999 | Nain | 710/22 |
| 5,982,672 A | 11/1999 | Moon et al. | 365/189.01 |
| 5,983,289 A | 11/1999 | Ishikawa et al. | 710/35 |
| 5,991,900 A | 11/1999 | Garnett | 714/56 |
| 5,996,035 A | 11/1999 | Allen et al. | 710/103 |
| 6,000,043 A | 12/1999 | Abramson | 714/44 |
| 6,009,535 A | 12/1999 | Halligan et al. | |
| 6,012,120 A | 1/2000 | Duncan et al. | 710/129 |
| 6,021,456 A | 2/2000 | Herdeg et al. | 710/260 |
| 6,026,458 A | 2/2000 | Rasums | 710/103 |
| 6,032,271 A | 2/2000 | Goodrum et al. | 714/56 |
| 6,041,375 A | 3/2000 | Bass et al. | 710/103 |
| 6,047,343 A | 4/2000 | Olarig | 710/102 |
| 6,049,894 A | 4/2000 | Gates | 714/41 |
| 6,055,584 A | 4/2000 | Bridges et al. | 710/27 |
| 6,062,480 A | 5/2000 | Evoy | 235/492 |
| 6,073,196 A | 6/2000 | Goodrum et al. | 710/103 |
| 6,098,137 A | 8/2000 | Goodrum et al. | 710/129 |
| 6,106,567 A * | 8/2000 | Grobman et al. | 716/5 |
| 6,125,417 A | 9/2000 | Bailis et al. | 710/103 |
| 6,141,769 A | 10/2000 | Petivan et al. | 714/10 |
| 6,321,286 B1 | 11/2001 | Goodrum et al. | |
| 6,587,813 B1 * | 7/2003 | Whitt et al. | 702/186 |
| 6,598,106 B1 | 7/2003 | Grieshaber et al. | |
| 2002/0129303 A1 | 9/2002 | Karppanen | |
| 2002/0156954 A1 | 10/2002 | Edwards | |

* cited by examiner

APPARATUS AND METHODS FOR IDENTIFYING BUS PROTOCOL VIOLATIONS

FIELD OF THE INVENTION

The present invention relates to computer bus systems, and more specifically, to apparatus and methods for identifying violations of bus protocols.

BACKGROUND OF THE INVENTION

A bus is like a highway on which data travel within a computer. It is simply a channel over which information flows between two or more devices. A bus normally has access points, or places by which a device can become attached to the bus. Devices on the bus send information to, and receive information from, other devices on the bus. For example, a processor bus is the bus that devices and processors use to communicate with each other. Computer systems also typically include at least one input/output (I/O) bus, such as a peripheral component interconnect (PCI) bus, which is generally used for connecting performance-critical peripherals to a memory, other devices, and the processor. For example, video cards, disk storage devices, high-speed network interfaces generally use a bus of this sort. Personal computers (PC) typically also include additional I/O buses, such as an industry standard architecture (ISA) bus, for slower peripherals such as a mouse, a modem, a standard sound card, a low-speed networking interface, and also for compatibility with older devices.

Each transaction initiated on a processor bus typically goes through three general stages: an arbitration phase, an address phase, and a data phase. For a component connected to the bus to initiate a transaction on the bus, the component must obtain "ownership" of the bus. This happens during the arbitration phase. The transaction begins with the component initiating the transaction, known as the requesting component, signaling that it wants to use the bus. Once the requesting component acquires bus ownership from a bus arbiter, the component sends an address out on the bus during the address phase that identifies the target of the transaction—the target component. All components on the bus receive the address and determine which of them is the target component. Finally, during the data phase, the requesting component places data, which may be a command or request, on the bus for the target component to read.

These general stages of a bus transaction may be further divided into additional phases on more complex buses. These additional phases may include the following: arbitration phase, request phase, error phase, snoop phase, response phase, and data phase.

Specific bus transactions, such as data reads or writes, may take a relatively long time to complete, or the target component may be busy, and therefore, not available to immediately complete the request. In cases such as these, the target component may choose to defer responding to the transaction request to a later time, in which case the target component is called a deferring component. Further, the target component may assert a retry signal, notifying the requesting component that the target component cannot handle the transaction now, and the requesting component should try the transaction again later.

The requesting component keeps track of each transaction it initiates. Typically, the requesting component records transaction information, such as the target component's address, transaction type, transaction phase, etc., in a buffer. In some embodiments the transaction information is stored in a value referred to as a transaction identifier (TRID). A typical transaction proceeds through the various phases and completes, then the transaction information is removed from the buffer, making room for additional transactions.

If a transaction is deferred, the transaction information is kept in the buffer until the transaction completes. For example, in a memory read transaction issued by a processor, the processor may provide an identification of the request type and the memory address from which to read the data during the request phase. If the component memory controller) cannot handle the request immediately, or if the transaction will take a relatively long time to complete, it may defer the request. The memory controller may complete the memory read at a later time, and then initiate another transaction to provide the data to the processor. The information regarding the original memory read transaction must be stored in the buffer until the memory provides the data in the subsequent bus transaction, so that the processor can determine with which transaction the received data is associated.

In systems employing error detection, detection of the widest variety of errors at the earliest possible time is beneficial. Each instruction cycle that an error remains undetected allows the error to propagate and potentially create greater damage (e.g., corruption of memory contents). In certain mission-critical applications, such as air-traffic control, military systems, financial systems, and other emergency systems (e.g., "911" service), high-availability and high-reliability computing is required. Typically, redundant, fault-tolerant systems are employed because the reliability and availability of individual system components is insufficient to satisfy the overall system requirement. Fault-tolerant systems detect and identify errors to isolate faulty system components, switch-over to redundant system components, and preserve system integrity. However, such systems typically check for each kind of error sequentially thereby reducing the throughput of the system.

The present invention addresses the above discussed, and other, shortcomings of the prior art.

SUMMARY OF THE INVENTION

Systems and processes for an improved protocol error detector are disclosed which are useful in a wide variety of applications including detecting protocol violations in a computer communications bus, but which are not limited to a synchronous communications bus.

According to one aspect of the invention, a protocol error detector comprises a physical error detector detecting physical protocol violations, a sequential protocol error detector detecting sequential protocol violations and a logical protocol error detector detecting logical protocol violations. The protocol error detector signals a bus transaction error when at least one of the physical error detector, the sequential error detector, or the logical error detector detects a protocol violation. In one embodiment, the protocol error detector substantially simultaneously checks a bus transaction, or phases of a bus transaction, for physical, sequential, and logical protocol violations. In another embodiment, the protocol error detector provides an error signal upon the detection of one or more of the physical, sequential, and logical protocol violations, substantially coincident with the bus transaction, or phases of a bus transaction.

In another aspect of the invention, the protocol error detector is used within a redundant fault-tolerant bus architecture, checking a bus transaction, or phases of a bus transaction for protocol violations on each of a plurality of redundant busses. In one embodiment, the busses are synchronous locked-step busses each carrying the same bus transaction and bus phase information on the same clock cycle. The same bus transactions on each of the redundant busses are then compared for equivalence by a voter. System faults are identified when a miscompare occurs at the voter. The protocol error detector detects a protocol violation and reports the detected protocol violation to the voter to assist in the identification of system faults as soon as possible and to assist in the identification and isolation of the actual faulty component.

BRIEF DESCRIPTION OF THE DRAWINGS

The invention is pointed out with particularity in the appended claims. The drawings are not necessarily to scale, emphasis instead generally being placed upon illustrating the principles of the invention. Like reference characters in the respective drawing figures indicate corresponding parts. The advantages of the invention described above, as well as further advantages of the invention, may be better understood by reference to the description taken in conjunction with the accompanying drawings, in which:

DETAILED DESCRIPTION OF THE INVENTION

Figure 1:
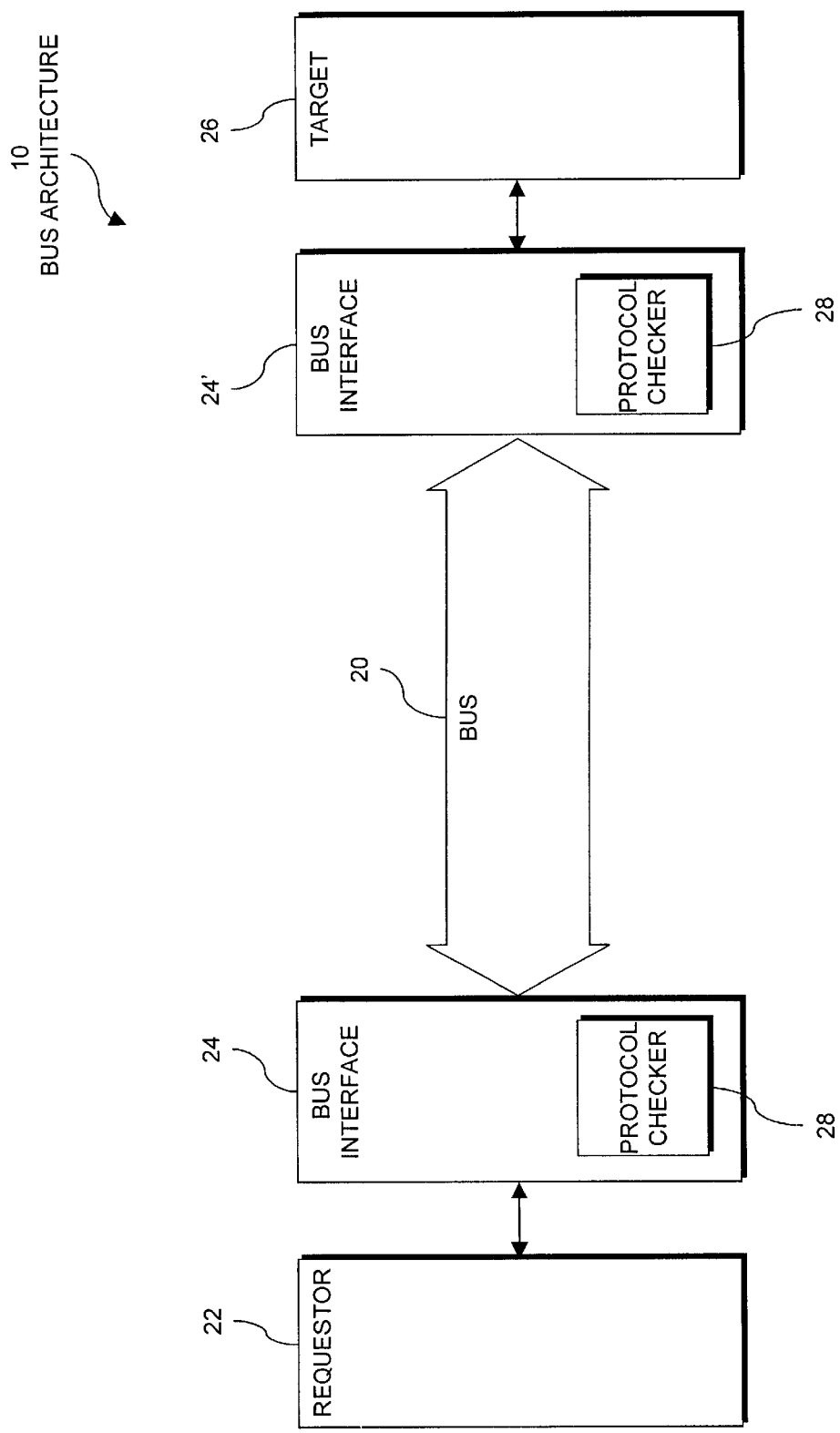
FIG. 1 is a block diagram of a bus architecture incorporating one embodiment of the invention.

Depicted in FIG. 1 is a portion of a computer system utilizing a bus architecture 10. The bus architecture 10 includes at least one communications bus 20, a requester 22, a first bus interface 24, a second bus interface 24', and a target 26. The requestor 22 is in communication with the bus 20 through the first bus interface 24. Similarly, the target 26 is in communication with the bus 20 through the second bus interface 24'.

Each of the requester 22 and the target 26 can be a system, a module, a circuit board, or a component, such as an integrated circuit. Each of the first and second bus interfaces 24, 24' (generally 24) can also be a system, a module, a circuit board, or a component, such as an integrated circuit. Each of the bus interfaces 24 individually can be separate from, or contained within, the respective requestor 22 or the target 26.

In operation, the requester 22 communicates with the target 26 by initiating a bus operation typically transferring information. For example, bus operations include but are not limited to a memory read, a memory write, an input/output (I/O) read, an I/O write, a configuration read, a configuration write, or a special command. Each operation further includes one or more transactions, where a transaction represents a series of communications between the requester 22 and target 26.

Bus transactions operate according to a predefined protocol. The protocol represents a set of rules defining how to transfer data between devices 22, 26 using the bus 20. The rules established by the protocol define such aspects as data formatting (e.g., the syntax of messages), the bus interface-to-requestor dialogue and the bus interface-to-target dialogue, character sets, and the sequencing of messages. In one embodiment, the protocol is an industry standard protocol (e.g., PCI, ISA, Extended Industry Standard Architecture (EISA), Video Electronics Standards Association (VESA) local bus, Personal Computer Memory Card International Association (PCMCIA), Micro Channel, Accelerated Graphics Port (AGP), Universal Serial Bus (USB), Small Computer Systems Interface (SCSI), and VME). In other embodiments, the protocol is a proprietary protocol.

Figure 2:
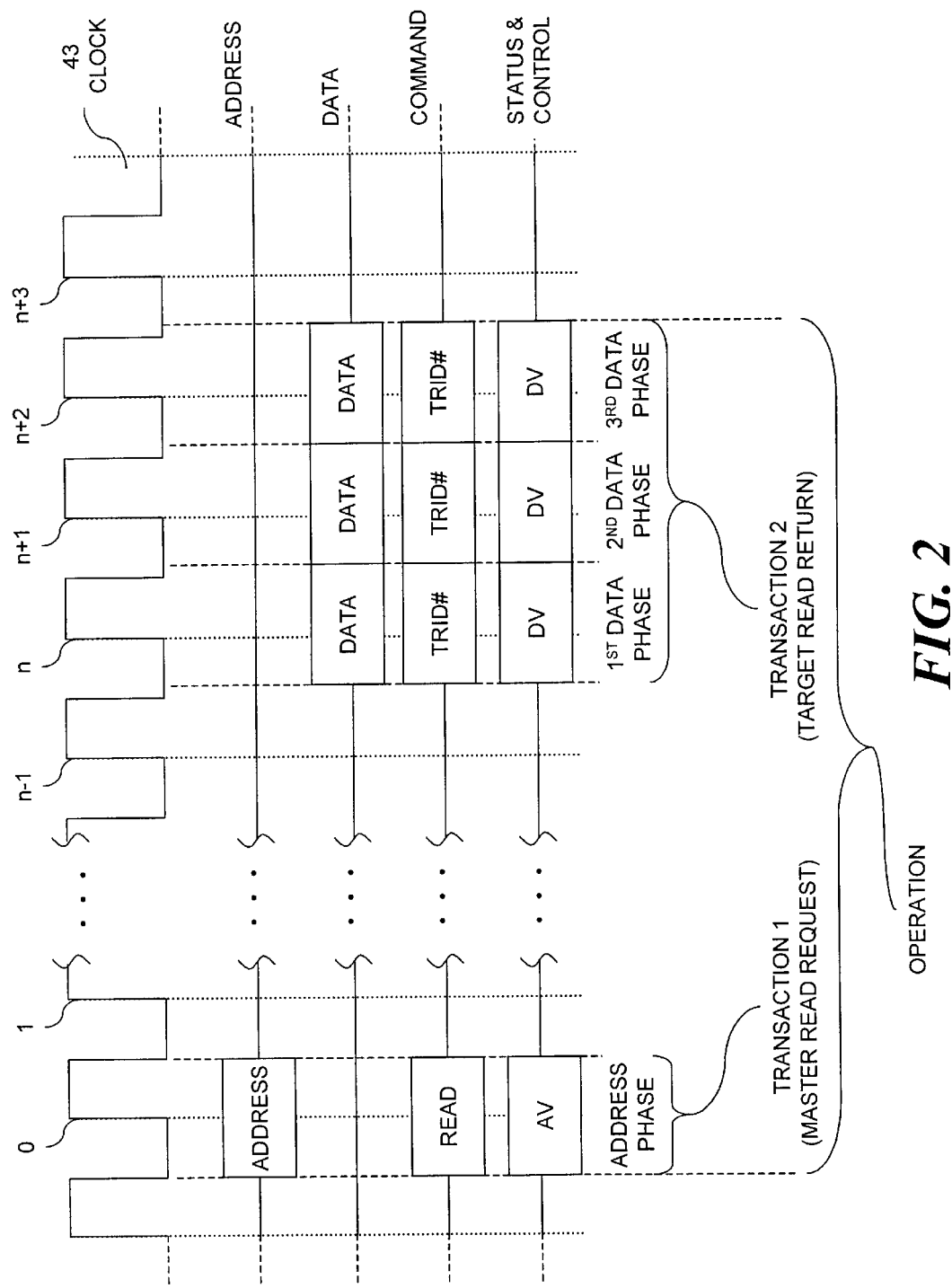
FIG. 2 is a timing diagram of a bus operation of one embodiment of the invention.

FIG. 2 depicts one illustrative example of a bus operation for a read operation on a synchronous bus, such as a PCI bus. In one embodiment, the bus 20 is a parallel bus including a number of parallel lines that are defined in one or more functional groups. In some embodiments, the functional groups include memory location address (ADDRESS), data transferred (DATA), command (COMMAND), and status and control (STATUS & CONTROL). In other embodiments the bus 20 is a serial bus whereby the one or more functional groups are defined by serial packets of information, or groups of bytes within a serial packet of information. Also illustrated is a reference clock functional group (CLOCK) 43 providing a timing reference signal for the exemplary synchronous bus 20. Information is provided using the appropriate signals by the requester 22 and target 26. In a synchronous embodiment, the devices 22, 26 driving the bus 20 provide, or set up, the driving signals on each of the lines of the appropriate functional groups prior to a timing event, such as the rising edge of the CLOCK 43. In another embodiment the timing event is the falling edge of the CLOCK 43. The devices 22, 26 receiving information from the bus 20, read the provided signals substantially coincident with the timing event.

Five functional groups are illustrated in the exemplary bus shown in FIG. 2: CLOCK 43; ADDRESS; DATA; COMMAND; and STATUS & CONTROL. In one embodiment each of these five functional groups includes one or more parallel lines. For example, in one embodiment the CLOCK 43 includes two lines, the ADDRESS includes 16 lines, the DATA includes 16 lines, the COMMAND includes 4 lines, and the STATUS & CONTROL includes 2 lines. Other embodiments are possible where the functional groups include different numbers of lines. For this example, the bus 20 may include 40 parallel lines. Other embodiments are possible, where some of the functional groups are multiplexed on the same lines of the bus, such as a PCI bus, where the ADDRESS and DATA are multiplexed onto the same lines. For this example, the COMMAND functional group allows up to sixteen, four-bit binary commands. The parallel lines of the bus 20 can be fabricated out of a conductive material such as copper, aluminum, or gold, or a dielectric material such as silica used in optical waveguides.

In one embodiment the bus 20 is a split-transaction bus. In a split-transaction bus, the requester 22 initiates a first transaction, such as a "read" command directed to the target 26. This first transaction consists of one address phase where the lines of the ADDRESS functional group are driven by the requestor 22 with the address value of the data to be read, the lines of the COMMAND functional group are driven with the syntax identifying a read command, and the lines of the STATUS & CONTROL functional group are driven with the syntax identifying that the address is valid (AV). The requestor 22 has provided the driving signals prior to the rising edge of a reference clock cycle, "cycle 0." The target 26 reads the signals on bus cycle 0 determining that requestor 22 has requested to read the data at the identified address. The target 26 can immediately provide the requested read data on the next bus cycle (bus cycle 1) or provide the requested read data at a later time, such as "n" clock cycles later on "bus cycle n." The target 26 replies with a second transaction representing a "read return." The target drives the lines of the DATA functional group with the requested read data. In one embodiment, the target drive the lines of the COMMAND functional group with indicia indicating the particular transaction (e.g., transaction 1 in this example) to which the read return data is related. The transaction identifying indicia is sometimes referred to as a TRID. The target 26 also drives the signals of the STATUS & CONTROL functional group with the syntax identifying that the data is valid (DV). In this example, transfer of the requested read data requires three bus cycles determined by the amount of read data requested. The read transaction and read request transactions taken together comprise a read operation. In an alternative embodiment for a non-split-transaction bus, the two transactions of the illustrative example occur sequentially as a single transaction; the data phases immediately following the address phase.

In one embodiment of a shared bus 20 the requester 22 and target 26 relinquish control of the bus 20 after the exemplary bus operation is completed (e.g., the lines are transitioned to an intermediary, or high-impedance state). In addition to the bus functional groups illustrated in FIG. 2, additional bus functional groups can be included to coordinate bus access, control, and status (e.g., for a PCI bus the signals include initiator ready (IRDY), target ready (TRDY), and device selected (DEVSEL)).

Referring again to FIG. 1, in one embodiment, each of the bus interfaces 24 includes a protocol checker 28. In one embodiment, each of the protocol checkers 28 monitors bus activity for the status of the bus 20 during the one or more bus cycles of each phase of each transaction of the respective bus operation. Each of the protocol checkers 28 monitors bus activity directed towards its associated requestor 22 or target 26. Each of the protocol checkers 28 checks the protocol of the monitored bus activity to detect protocol violations. Upon detecting a protocol violation, the protocol checker 28 provides an error notification. The protocol checker 28 can be a system, a module, a circuit board, or a component, such as an integrated circuit. The protocol checker 28 can also be implemented as a sub-element of the bus interface 24.

Figure 3:
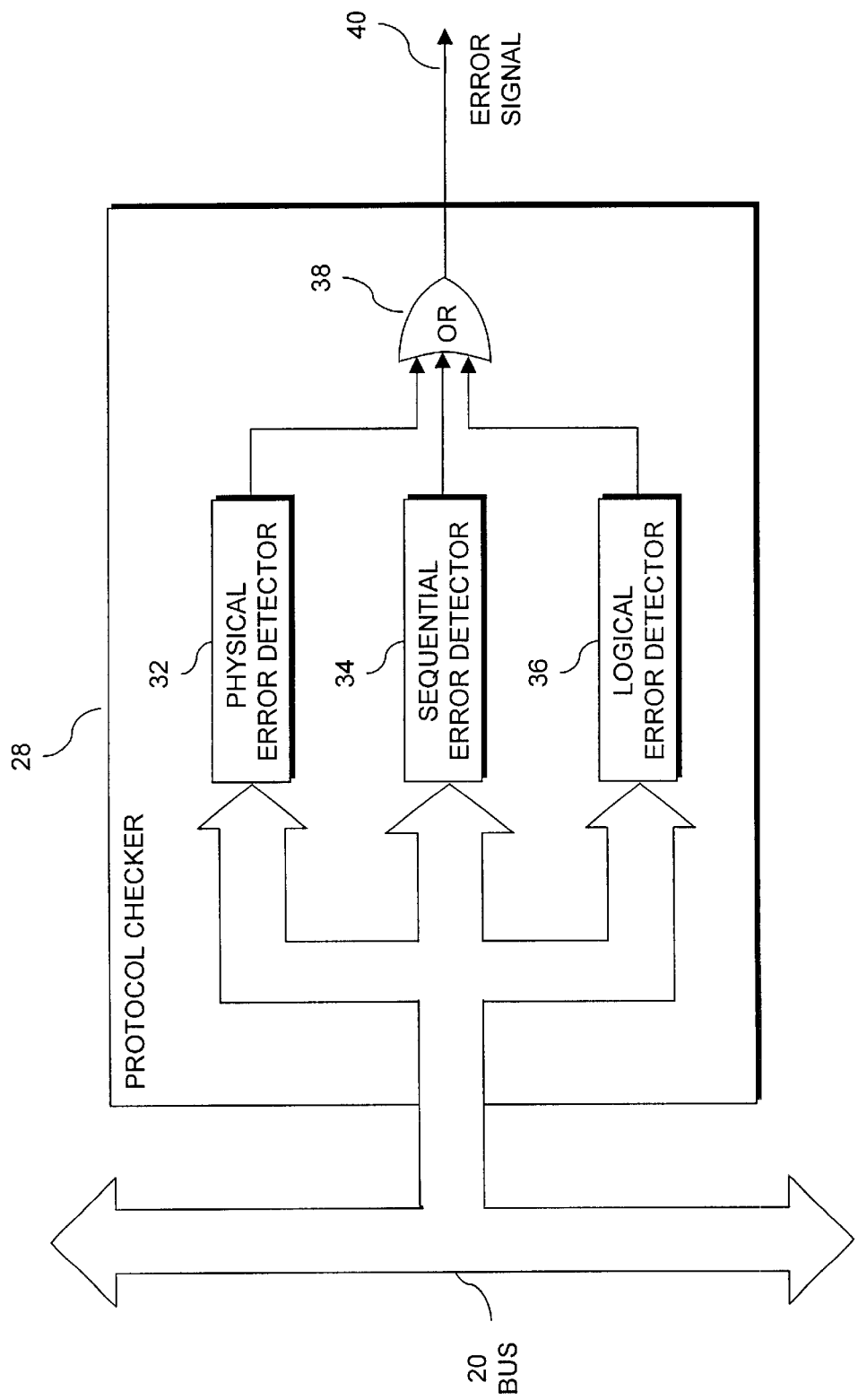
FIG. 3 is a block diagram of one embodiment of the protocol checker of the invention shown in FIG. 1.

Referring to FIG. 3 in more detail, the protocol checker 28 includes at least one input port and at least one output. The input port of the protocol checker 28 is connected to the bus 20. For a parallel bus, the input port of the protocol checker 28 will include individual input terminals for each of the parallel lines of the bus. The output of the protocol checker 28 provides an error signal 40. The error signal 40 identifies the detection of a physical protocol error, a sequential protocol error, and/or a logical protocol error.

The protocol checker 28 includes a physical error detector 32, a sequential error detector 34, and a logical error detector 36. Each of the physical error detector 32, the sequential error detector 34, and the logical error detector 36 includes at least one input port and at least one output. The input port of each of the error detectors 32, 34, 36 is connected to the bus 20. The output signal of each of the error detectors 32, 34, 36 is combined to produce an output error signal 40 representing a logical "OR" of the outputs of each of the individual error detectors 32, 34, 36. In one embodiment, the logical "OR" is a wired-OR. In another embodiment, the logical "OR" is an OR gate. In yet other embodiments, the logical "OR" is implemented in software.

Figure 4:
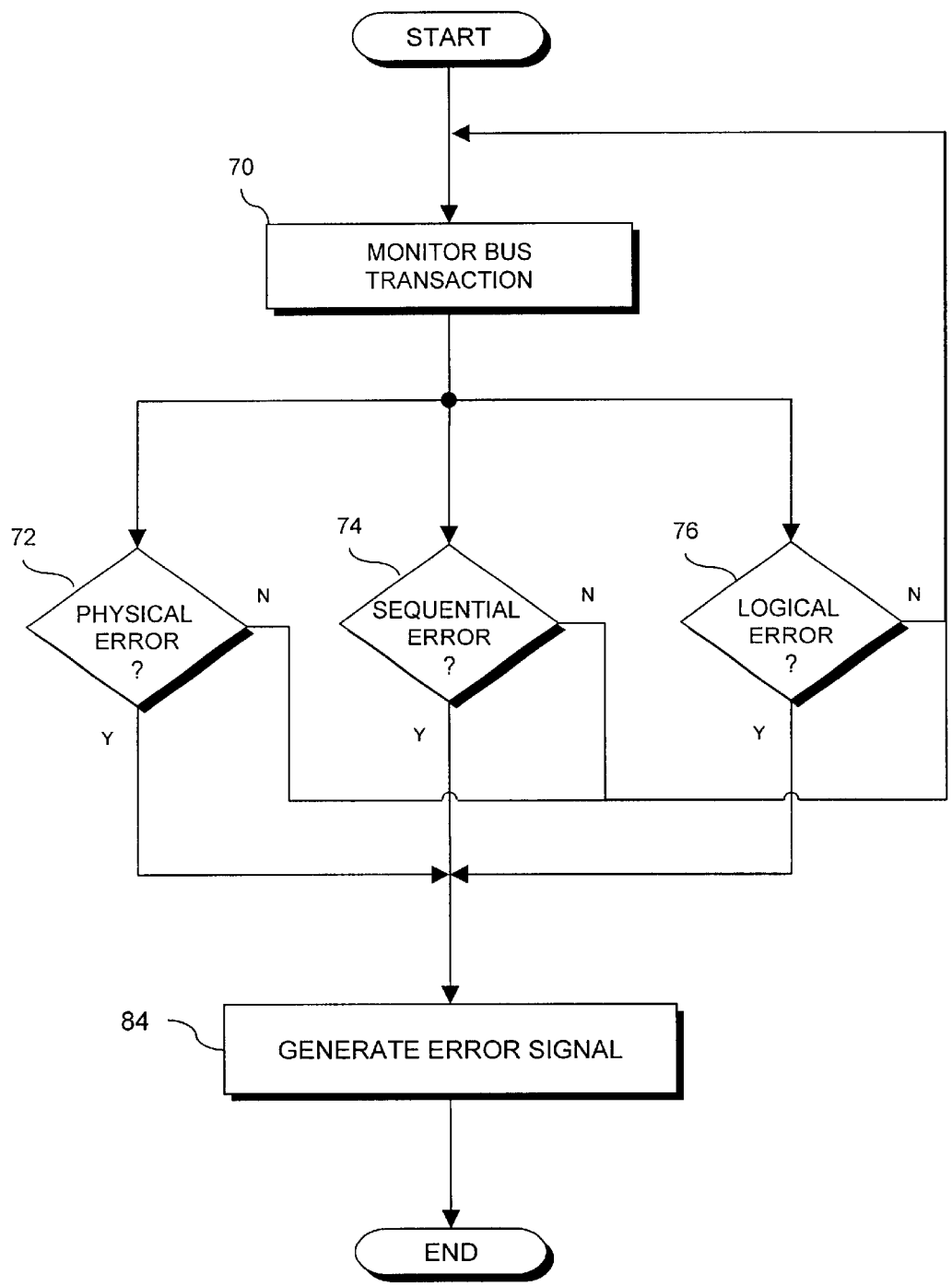
FIG. 4 is a flow diagram of one embodiment of the steps utilized by one embodiment of the invention to detect an error condition.

Referring to FIG. 4, in operation, the protocol checker 28 monitors a bus transaction (step 70). The protocol checker 28 checks the monitored transaction for physical protocol violations (step 72), for sequential protocol violations (step 74), and for logical protocol violations (step 76). The physical error detector 32 checks for physical errors, the sequential error detector 34 checks for sequential errors, and the logical error detector 36 checks for logical errors. In one embodiment, the protocol checker 28 checks the monitored transaction for physical protocol violations (step 72), for sequential protocol violations (step 74), and for logical protocol violations (step 76) substantially simultaneously. In one embodiment, upon detecting a physical protocol violation, the physical error detector signals a physical error to the respective input terminal of the logical OR gate 38. Upon detecting a sequential protocol violation, the sequential error detector 34 signals a sequential error to the respective input terminal of the logical OR gate 38. Finally, upon detecting a logical protocol violation, the logical error detector 36 signals a logical error to the respective input terminal of the logical OR gate 38. The logical OR gate 38 provides (step 84) an output signal when an input signal is provided at any of its input terminals. The output signal of the logical OR gate 38 represents the error signal 40 output of the protocol checker 28. In one embodiment, the protocol checker 28 generates the error signal 40 during the same clock cycle (or bus cycle) of the same bus transaction responsible for the ERROR SIGNAL 40. In some embodiments, the protocol checker 28 generates the ERROR SIGNAL 40 during the same relative bus cycle, as there may be some time delay between receipt of a transaction at the bus port of the bus interface 24 and delivery of the transaction by the bus interface 24 to the respective requestor/target 22, 26. If protocol violations are not detected in steps 72, 74, and 76, the next bus transaction is monitored (step 70).

Figure 5:
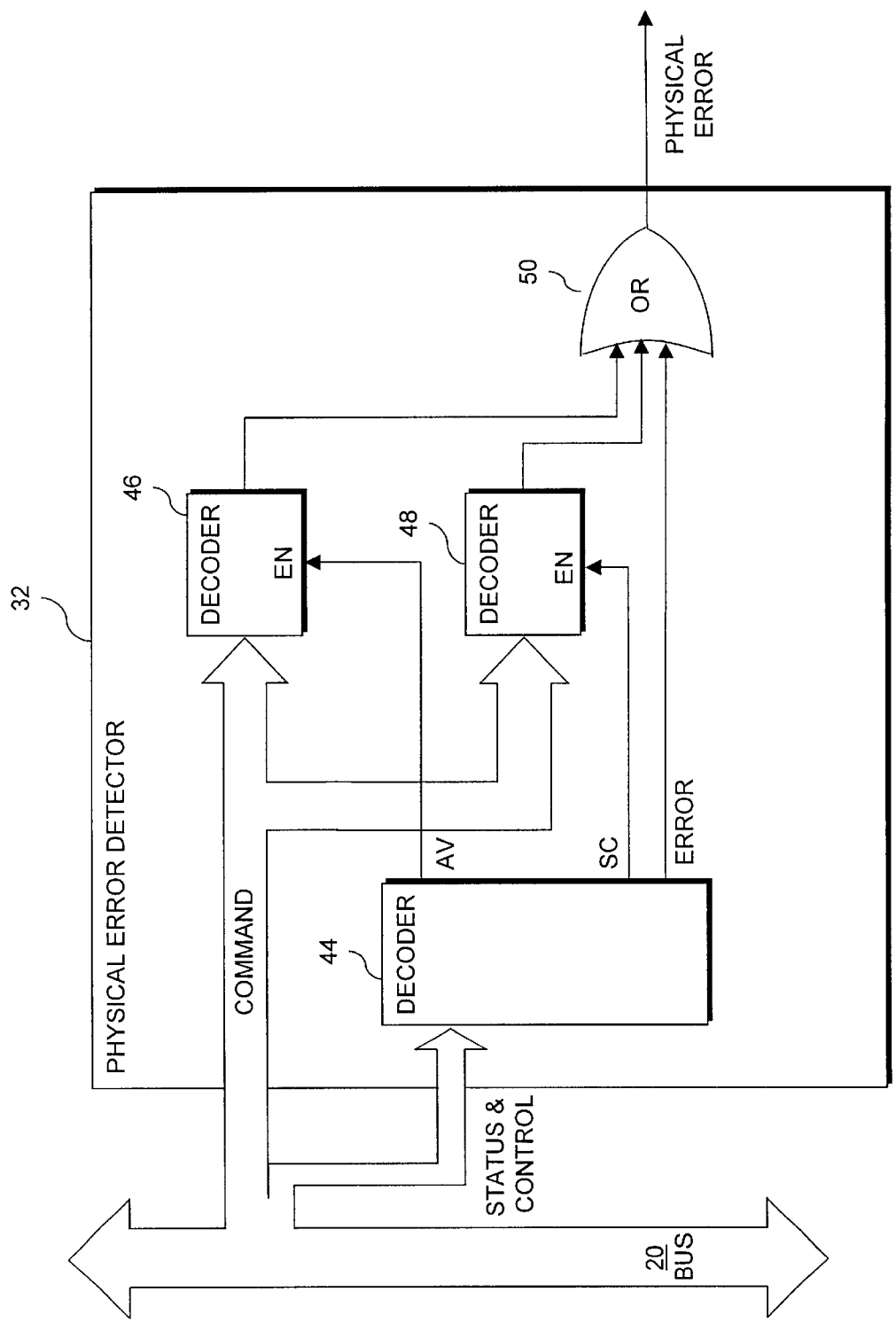
FIG. 5 is a block diagram of one embodiment of a physical error detector of the invention, shown in FIG. 3.

Referring to FIG. 5, in one embodiment the physical error detector 32 includes two inputs (COMMAND and STATUS & CONTROL), and one output (PHYSICAL ERROR). The physical error detector 32 includes a first decoder 44, a second decoder 48, a third decoder 46, and a logical OR gate 50. In some embodiments, the logical OR gate 50 can be implemented as a wired-OR, while in other embodiments, the logical OR gate 50 can be implemented in software. The first decoder 44 includes one input and three outputs: address valid (AV); special command (SC); and ERROR. One input of the second, and third decoders 48, 46 is connected to the bus lines representing the COMMAND functional group. A second (enable) input of the second decoder 48 is connected to the SC output line of the first decoder 44, while a second (enable) input of the third decoder 46 is connected to the AV output line of the first decoder 44. The output of the second and third decoders 48, 46 and the ERROR output of the first decoder 44 are connected to a respective input terminal of the OR gate 50. The output of the logical OR gate 50 represents the PHYSICAL ERROR output of the physical error detector 22. In one embodiment, the decoders 44, 48, and 46 are each implemented with combinatorial logic. In other embodiments, the decoders 44, 48, and 46 are implemented as state machines. In some embodiments where the decoders 44, 48, and 46 are implemented as state machines, the state machines are clocked in advance of the bus cycle (e.g., bus cycle clocks on the rising edge, decoder state machines clock on the falling edge of the same clock cycle).

In one embodiment, the syntax of the bus protocol defines different command sets for the COMMAND functional group, depending on whether the command is associated with a STATUS & CONTROL indicator of AV or SC. Each of the different defined command sets can also have reserved, and/or error commands.

In operation, the first decoder 44 decodes information on the lines of the STATUS & CONTROL functional group. If the STATUS & CONTROL information decodes to a reserved, undefined, or error indicator, the first decoder 44 signals an error by providing a signal on its output to a respective input of the logical OR gate 50. If the first detector 44 decodes a STATUS & CONTROL of SC, the first decoder 44 provides a signal on its SC output suitably enabling the second decoder 48. Once enabled, the second decoder 48 decodes the COMMAND functional group corresponding to a STATUS & CONTROL value of SC (e.g., special commands). If the COMMAND functional group decodes to a reserved or error value, the second decoder 48 signals an error by providing a signal on its output to a respective input of the logical OR gate 50. Similarly, if the first detector 44 decodes a STATUS & CONTROL of AV, the first decoder 44 provides a signal on its AV output suitably enabling the third decoder 46. Once enabled, the third decoder 46 decodes the COMMAND functional group corresponding to a STATUS & CONTROL value of AV (e.g., standard commands). If the COMMAND functional group decodes to a reserved or error value, the third decoder 46 signals an error by providing a signal on its output to a respective input of the logical OR gate 50. The logical OR gate 50 provides an output PHYSICAL ERROR if an error is reported at one or more of its inputs.

In another embodiment, the physical error detector 32 connects to the lines of the ADDRESS functional group and includes suitable decoders to decode the address. If an invalid address is decoded, the physical error detector 32 provides a PHYSICAL ERROR signal at its output.

Referring now in more detail to the sequential error detector 34, shown in FIG. 3, the sequential error detector 34 has at least one input and at least one output where the input is connected the bus 20 and the output provides a SEQUENTIAL ERROR signal. In one embodiment, the sequential error detector 34 includes one or more decoders and one or more registers. In one embodiment the sequential error detector 34 receives bus transactions at its input and monitors the COMMAND functional group, decoding the commands for each bus transaction. The sequential error detector 34 stores indicia (e.g., a TRID) relating to requested bus transactions that require a corresponding response transaction (e.g., the read request and the read return of the delayed read operation illustrated in FIG. 2). In one embodiment the TRIDs are stored in a buffer. The sequential error detector 34 monitors each bus transaction checking the indicia of the monitored bus transaction and determining if the monitored transaction responds to a request. In one embodiment, the TRID includes indicia of the requesting COMMAND value. If the transaction is a response transaction, the sequential error detector 34 further determines if a corresponding previously issued and currently outstanding requesting transaction exists. In one embodiment the sequential error detector 34 checks the contents of the buffer to determine if a TRID of a requesting transaction is present. No error will be signaled if a corresponding previously issued and currently outstanding requesting transaction exists. However, if a corresponding requesting transaction had not issued, or a corresponding issued requesting transaction had already been satisfied, the sequential error detector 34 would signal an error at its SEQUENTIAL ERROR output. For example, if the monitored transaction is a delayed read return transaction with a TRID value of "A," there should be a corresponding, and unsatisfied read request corresponding to a TRID value of "A."

If the monitored transaction concludes the bus operation, all TRIDs related to the same concluded bus operation are removed from the buffer. If, however, a TRID indicating the existence of a previously issued and currently outstanding transaction is not contained within the buffer, the sequential error detector 34 provides an output indicating a sequential protocol violation. In some embodiments TRIDs are not stored in the register for transactions that do not require a return transaction, such as a posted memory write (PMW).

Figure 6:
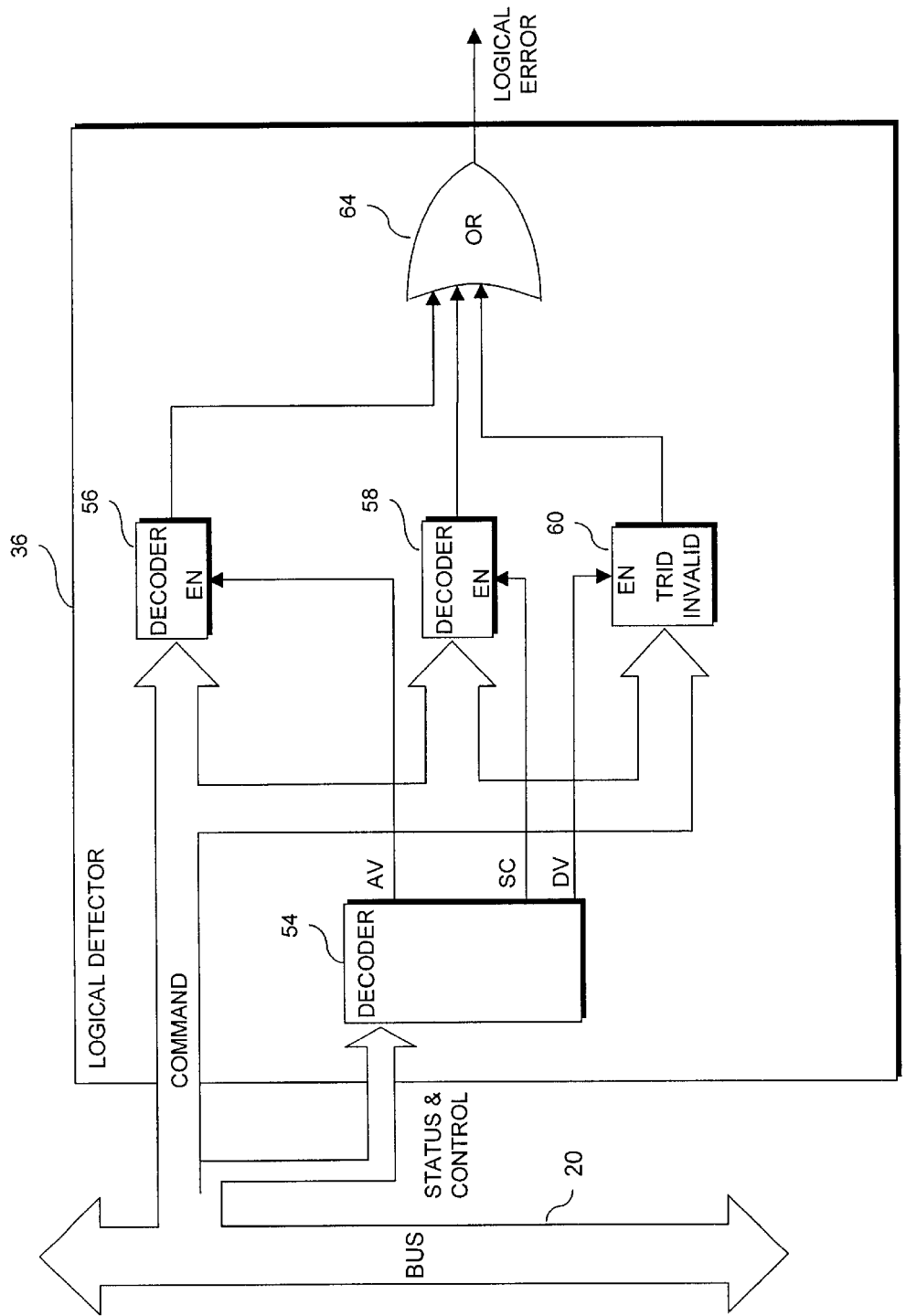
FIG. 6 is a block diagram of one embodiment of a logical error detector of the invention, shown in FIG. 3.

Referring to FIG. 6, in one embodiment the logical error detector 36 at least two inputs COMMAND and STATUS & CONTROL, and at least one output (LOGICAL ERROR). In one embodiment the logical error detector 36 includes a first decoder 54, a second decoder 58, a third decoder 56, a TRID validator 60, and a logical OR gate 64. In some embodiments, the logical OR gate 64 can be implemented as a wired-OR, while in other embodiments, the logical OR gate 64 can be implemented in software. The first decoder 54 includes one input and three outputs: AV; SC; and data valid (DV). The first input of both the second and third decoders 58, 56 and the TRID validator 60 is connected to the bus lines representing the COMMAND functional group. A second (enable) input of the second decoder 58 is connected to the SC output line of the first decoder 54, while a second (enable) input of the third decoder 56 is connected to the AV output line of the first decoder 54. A second (enable) input of the TRID validator 60 is connected to the DV output line of the first decoder 54. The output of the second and third decoders 58, 56 and the output of the TRID validator 60 are connected to a respective input terminal of the logical OR gate 64. The output of the logical OR gate 64 is in communication with the LOGICAL ERROR output of the logical error detector 36. In one embodiment, the decoders 54, 58, and 56 are each implemented with combinatorial logic. In other embodiments, the decoders 54, 58, and 56 are implemented as state machines. In some embodiments where the decoders 54, 58, and 56 are implemented as state machines, the state machines are clocked in advance of the bus cycle (e.g., bus cycle clocks on the rising edge, decoder state machines clock on the falling edge of the same clock cycle).

In operation, the three decoders 54, 58, and 56 of the logical error detector 36 function in a manner similar to the three decoders 44, 48, and 46 of the physical error detector 32 shown in FIG. 5. The first decoder 54 decodes the STATUS & CONTROL value and enables the second or third decoder 58, 56 for a STATUS & CONTROL value of SC or AV, respectively. The enabled second or third decoder 58, 56 decodes the COMMAND functional group and signals a logical error when the COMMAND functional group decodes to a value that is logically incorrect for the decoded STATUS & CONTROL value. In some embodiments, the logical error detector 36 is associated with a particular category of requestor/target device 22, 26, such as a processor, a memory, or a peripheral device. Depending on the category of the associated requestor/target 22, 26, some commands are logically inappropriate. For example, where the target is a processor, an I/O read or an I/O write command directed to the processor target would be logically inappropriate. For this example, the second and third decoders 58, 56 of the logical error detector 36 would decode an error for such a command depending on whether the STATUS & CONTROL functional group decoded to a value of special command (SC) or address valid (AV) are set, respectively.

When a delayed transaction requiring a return transaction is issued on a split transaction bus, a TRID is assigned to identify the requesting transaction and to coordinate the responding transaction with the associated requester 22. In one embodiment, referring to FIG. 2, the TRID is provided on the COMMAND functional group during a data return, where the data return is identified by DV on the STATUS & CONTROL functional group. In one embodiment, the TRID validator 60 tracks outstanding TRIDs. In one embodiment, the TRID validator 60 includes a buffer storing outstanding TRIDSs. The TRID validator 60 is enabled by the DV output of the second decoder 54 and compares the TRID value of a return request transaction from the COMMAND functional group associated with the DV. If the interpreted TRID does not match an outstanding TRID, the TRID validator 60 provides an output indicating a detected logical error to the logical OR 64. If the TRID of the return request transaction does match one of the outstanding TRIDs stored in the TRID validator 60, the TRID validator removes the associated TRID value from the outstanding TRID register upon completion of the return request transaction (e.g., upon the observance of an end of transaction indication on the STATUS & CONTROL functional group).

Figure 7:
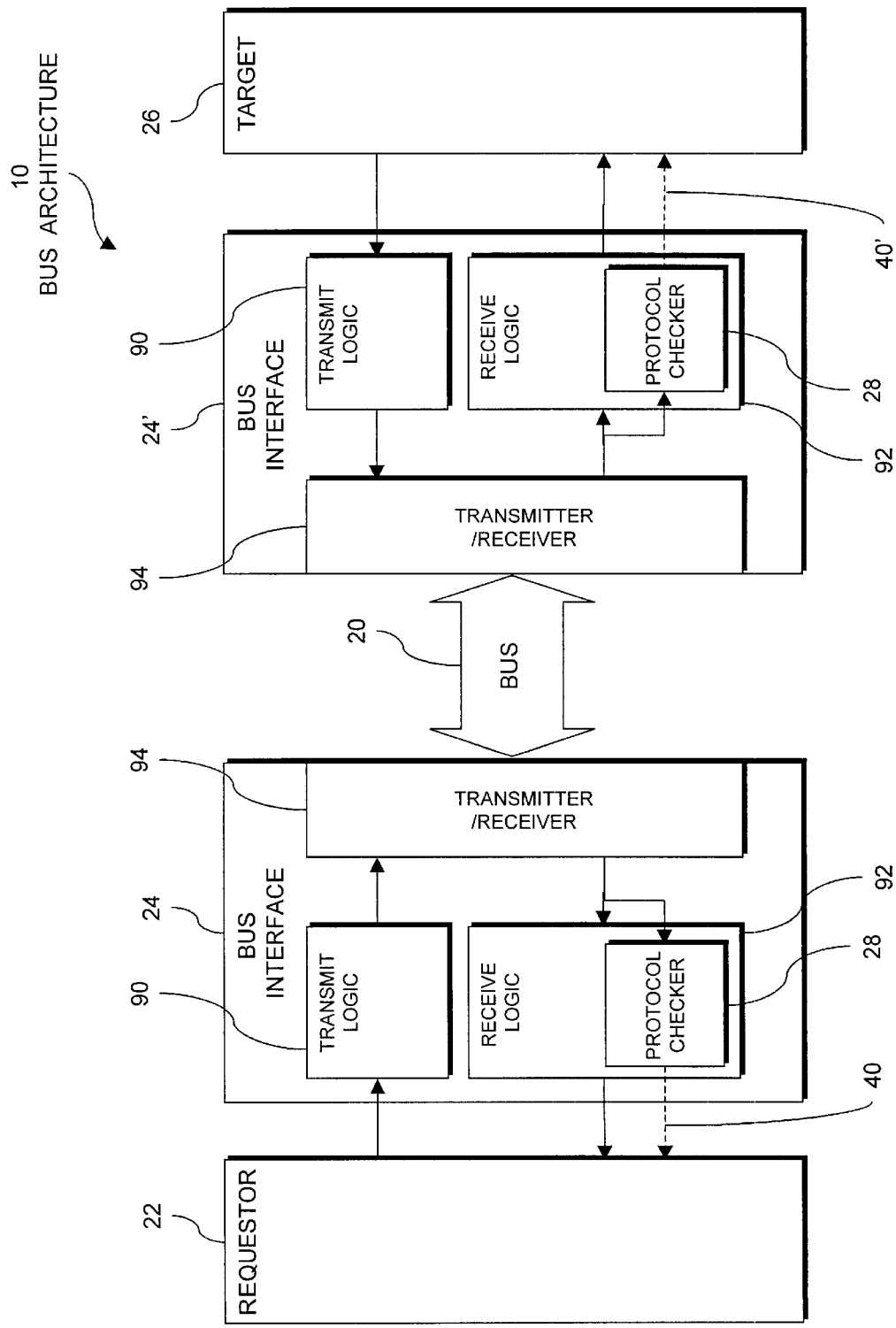
FIG. 7 is a more detailed block diagram of the embodiment of the invention shown in FIG. 1.

Referring to FIG. 7, each bus interface 24, 24' further includes a transmit logic element 90, a receive logic element 92, and a transmitter/receiver 94. The transmit logic element 90, the receive logic element 92 each have has at least one input and at least one output. The input of the transmit logic element 90 is connected to an output of the requestor/target 22, 26. The output of the transmit logic element 90 is connected to a first input of the transmitter/receiver 94. The input port of the receive logic element 92 is connected to an output of the transmitter/receiver 94, while the output of the receive logic element 92 is in communication with the input of the requestor/target 22, 26. A second input of the transmitter/receiver 94 is connected to the bus 20.

In one embodiment, the protocol checker 28 is included within the receive logic element 92. In another embodiment, the protocol checker 28 is separate from the receive logic element. The input of the protocol checker 28 is in also communication with the output of the transmitter/receiver 94 and the output of the protocol checker 28 may optionally be directed to the receive logic or to the requestor/target 22, 26 (connection shown in phantom). The protocol checker 28 receives its input in parallel with the receive logic element 92. As previously described, the protocol checker 28 provides an ERROR SIGNAL 40 at its output upon detecting a protocol violation received from the bus 20 at the associated bus interface 24. In some embodiments, the ERROR SIGNAL 40 is used by the requestor/target 22, 26 to halt the propagation of information related to the protocol violating transaction.

The transmitter/receiver 94 receives each cycle of a bus transaction directed to the associated requestor/target 22, 26. In one embodiment the transmitter/receiver 94 performs signal conditioning of each of the received signals of each cycle of the bus transaction. Signal conditioning includes among other things, adjusting signal levels and pulse shapes, and conversion from serial format to parallel format. In some embodiments, the transmitter/receiver converts the received signals from a first voltage or current level, such as that used in low voltage differential signaling (LVDS) to a second voltage or current level, such as TTL. In one embodiment, the transmitter/receiver 94 includes line drivers and receivers. In another embodiment, the transmitter/receiver 94 includes electro-optical transducers, such as laser diodes, and photodetectors. In a preferred embodiment, the transmitter/receiver 94 are LVDS devices, such as device numbers DS90CR483 (transmitter) and DS90CR484 (receiver) manufactured by National Semiconductor Corporation of Santa Clara, Calif.

Figure 8:
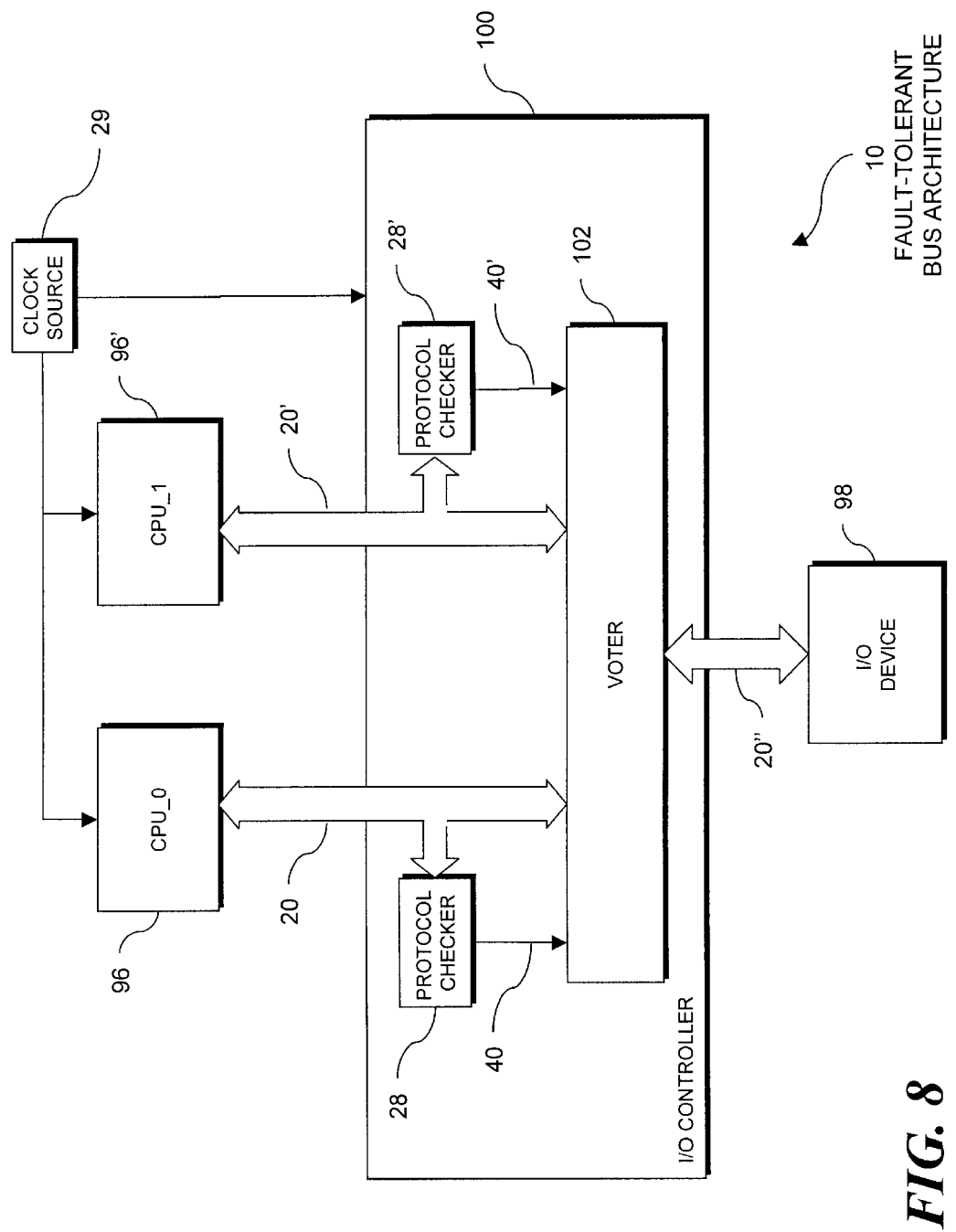
FIG. 8 is a block diagram of one embodiment of the invention used in a fault-tolerant system.

Referring to FIG. 8, in one embodiment, the protocol checker 38 is used within a redundant fault-tolerant bus architecture 10. The fault-tolerant bus architecture includes redundant first and second central processor units (CPU) 96, 96' (generally 96), each representing the requestor 22 of FIG. 1, a first and second redundant bus 20, 20' (generally 20), an I/O controller 100, and an I/O device 98, representing the target 26 of FIG. 1. In some embodiments of a synchronous fault-tolerant bus architecture 10, such as a lockstep architecture, the system 10 also includes a clock source 29. Each of the redundant CPUs 96 are in communication with the I/O controller 100 through the respective redundant bus 20. The input of each of the protocol checkers 28, 28' (generally 28) is in communication with the respective redundant bus 20 at the I/O controller 100, and the output of each of the protocol checkers 28 is in communication with a voter 102. The voter 102 compares I/O instruction streams from the redundant CPUs 96 checking for a miscompare. Where the I/O instruction streams of each of the CPUs 96 are substantially identical, one of the I/O instruction streams is forwarded to the I/O device 98. Where there is a miscompare, system fault-tolerant diagnostic routines identify a faulty device and take appropriate corrective action, such as removing the identified faulty device for further diagnostics, repair, or replacement.

In one embodiment of a locked-step fault-tolerant bus architecture 10, the voter 102 compares the redundant signals on the parallel lines of the two redundant busses 20, 20' during each cycle of each phase of each bus transaction. If the inputs to the voter 100 compare successfully, signals from one of the busses 20, 20' are forwarded to the I/O device 98. If the inputs to the voter 102 do not compare successfully, the bus transaction can be blocked from propagating to the target 26 and fault diagnostics can be invoked to identify a faulty device responsible for the voter 100 miscompare. In a dual mode redundant system with two redundant CPUs 96, a miscompare at the voter 102 does not indicate which CPU 96 is in error. If the fault had not generated within the CPU 96 but was a result of any of the components between the CPU 96 and the voter 102, it would not be possible to determine which CPU 96 path is in error.

In one embodiment, each of the protocol checkers 28 checks the bus transactions received at the I/O controller 100 for protocol violations. If the protocol checker 28 determines a protocol violation on a bus transaction, the protocol checker 28 provides an error signal 40 to the voter 102 substantially simultaneously with the voting by the voter 100 of the faulty transaction. The voter uses the protocol violation information provided by the error signal 40 to assist in the detection and isolation of errors.

EXAMPLE

The following example is one way of using the invention to detect protocol violations on a bus transaction in an exemplary bus architecture 10 referred to hereafter as an "example bus." In this example, the example bus is operating similar to the bus illustrated in FIG. 2. The example bus 20 includes the ADDRESS functional group, consisting of 8 individual signals, the COMMAND functional group, consisting of three individual signals, and the STATUS & CONTROL functional group, consisting of two individual signals. The details of the exemplary protocol, and the syntax of the commands of the various signal groups are described in Tables 1 and 2.

When the STATUS signal group of Table 2 decodes to an value of "00" representing an AV, the COMMAND (CMD) functional group of Table 1 decodes to the CMD values in the second column of Table 1 (e.g., when the CMD signal group decodes to a value of "001", it represents a "memory write" command). When the STATUS & CONTROL functional group of Table 2 decodes to an value of "10" representing an SC, the CMD functional group of Table 1 decodes to the CMD values in the fourth column of Table 1 (e.g., when the CMD functional group decodes to a value of "001", it represents a "delayed write" command).

TABLE 1

Example Bus Command Protocol

| Bus Command (CMD) decode for "AV | | Bus Command (CMD) decode for "SC" | |
|---|---|---|---|
| CMD | Command | CMD | Command |
| 000 | Memory Read | 000 | Delayed Read |
| 001 | Memory Write | 001 | Delayed Write |
| 010 | I/O Read | 010 | Reserved |
| 011 | I/O Write | 011 | Reserved |
| 100 | Configuration Read | 100 | Reserved |
| 101 | Configuration Write | 101 | Reserved |
| 110 | Reserved | 110 | Special 1 |
| 111 | Reserved | 111 | Special 2 |

TABLE 2

Example Bus Status Protocol

| Bus Status (STATUS & CONTROL) | |
|---|---|
| STATUS & CONTROL | Status |
| 00 | AV |
| 01 | DV |
| 10 | SC |
| 11 | Reserved |

In checking for physical protocol violations, referring again to FIG. 5, the COMMAND signal group is substantially simultaneously input into decoders 46, 48, and the STATUS & CONTROL signal group is substantially simultaneously input into decoder 44. Where the STATUS & CONTROL maps to an AV, a CMD value of "110" or "111" decodes to a reserved AV command and the decoder 46 provides an output indicating a physical error. For any other value of CMD, the decoded value would be a legitimate function, at least from a physical perspective. Similarly, where the STATUS & CONTROL maps to an SC, a CMD value of "010," "011," "100," "101" decodes to a reserved SC command and the decoder 48 provides an output indicating a physical error. If the STATUS & CONTROL maps to a reserved value of "11" the STATUS & CONTROL decoder 44 provides an output ERROR indicating a physical error.

In checking for logical protocol violations, referring again to FIG. 6, the CMD signal group is substantially simultaneously input into decoders 56, 58, and the TRID validator 60 and the STATUS & CONTROL signal group is substantially simultaneously input into decoder 54. Depending on the particular variety of bus device that the logical error detector 36 is associated with, a subset of the valid commands shown in Table 1 may be inappropriate. If, for example, if the logical error detector 36 is associated with an I/O bus device, a logical error would be identified if the CMD value decodes to a "000," a memory read, or a "001" a memory write, where STATUS & CONTROL decodes to AV, because those commands are directed to memory.

Having shown the preferred embodiments, one skilled in the art will realize that many variations are possible within the scope and spirit of the claimed invention. It is therefor the intention to limit the invention only by the scope of the claims.

What is claimed is:

1. An apparatus for detecting protocol violation resulting from a bus operation according to a predetermined bus protocol, the bus operation comprising one or more transactions, each transaction comprising one or more phases, each phase comprising at least one functional group, the apparatus comprising:

a physical error detector checking one or more signals of the at least one functional group of each phase for invalid signal combinations;

a sequential error detector checking each transaction for an invalid phase sequence; and a logical error detector checking the bus operation for a logically invalid transaction, the invalid transaction having valid signal combinations and a valid phase sequence, wherein the apparatus signals a bus transaction error when at least one of the physical error detector, the sequential error detector, and the logical error detector signals an error.

2. The apparatus of claim 1 wherein the physical error detector, the sequential error detector, and the logical error detector perform their respective checks substantially simultaneously.

3. The apparatus of claim 1 wherein the invalid signal combinations comprise reserved signals.

4. The apparatus of claim 1 wherein the invalid signal combinations comprise undefined signals.

5. The apparatus of claim 1 wherein the physical error detector comprises combinatorial logic decoding the one or more signals.

6. The apparatus of claim 5 wherein the one or more signals comprise a bus command.

7. The apparatus of claim 5 wherein the one or more signals comprise a bus address/data.

8. The apparatus of claim 1 wherein the sequential error detector further comprises at least one register storing indicia identifying the one or more phases of the transaction.

9. The apparatus of claim 1 wherein the sequential error detector comprises combinatorial logic.

10. The apparatus of claim 1 wherein the sequential error detector further comprises at least one state machine.

11. The apparatus of claim 1 wherein the logical error detector checks the bus operation for an invalid transaction sequence.

12. The apparatus of claim 1 wherein the logical error detector further comprises at least one register storing indicia identifying the one or more transactions of the bus operation.

13. The apparatus of claim 1 wherein the logical error detector comprises combinatorial logic.

14. The apparatus of claim 1 wherein the logical error detector further comprises at least one state machine.

15. The apparatus of claim 1 wherein the apparatus signals a bus transaction error substantially simultaneously with a bus phase causing the error.

16. The apparatus of claim 1 signaling the detected error during the same bus cycle as the corresponding bus phase causing the error.

17. The apparatus of claim 1 wherein the apparatus checks for errors on a synchronous bus.

18. The apparatus of claim 17 wherein the synchronous bus is a split-transaction bus.

19. The apparatus of claim 1 wherein the predetermined protocol is a Peripheral Component Interconnect (PCI) bus protocol.

20. An apparatus for detecting protocol violation resulting from a bus operation according to a predetermined bus protocol, the bus operation comprising one or more transactions, each transaction comprising one or more phases, each phase comprising at least one functional group, the apparatus comprising:

a sequential error detector and at least one of the group consisting of a physical error detector and a logical error detector, wherein the apparatus signals a bus transaction error when at least one of the sequential error detector and the at least one of the group consisting of the physical error detector and the logical error detector signals an error.

21. The apparatus of claim 20 wherein the physical error detector, the sequential error detector, and the logical error detector perform their respective checks substantially simultaneously.

22. An apparatus for detecting protocol violation resulting from a bus operation according to a predetermined bus protocol, the bus operation comprising one or more transactions, each transaction comprising one or more phases, each phase comprising at least one functional group, the apparatus comprising:

a physical error detector checking the one or more signals of each phase for invalid signal combinations;

a sequential error detector checking each transaction for an invalid sequence; and a logical error detector checking the bus operation for a logically invalid transaction, the invalid transaction having valid signal combinations and a valid phase sequence, wherein the physical error detector, the sequential error detector, and the logical error detector perform their respective checks substantially simultaneously, and the apparatus signals a bus transaction error when at least one of the physical error detector, the sequential error detector, and the logical error detector signals an error.

23. A method for detecting a bus transaction error occurring on an electrical communications bus comprising:

(a) monitoring a bus transaction;

(b) detecting a physical error, a sequential error, and a logical error; and (c) generating an error detection signal in response to the detected bus transaction error.

24. The method of claim 23, step (b) further detecting the physical error, the sequential error, and the logical error substantially simultaneously with the bus transaction.

25. The method of claim 23, step (c) further generating the error detection signal substantially simultaneously with the bus transaction.

26. The method of claim 23 wherein step (a) comprises monitoring a synchronous bus transaction.

27. The method of claim 26 wherein the synchronous bus transaction is split-bus transaction.

28. The method of claim 26 wherein the synchronous bus transaction is a Peripheral Components Interconnect (PCI) bus transaction.

29. The method of claim 23 wherein step (c) further comprises generating an out-of-band error detection signal.

30. The method of claim 23 further comprising the step of providing the error detection signal substantially simultaneously with the bus transaction.

31. A method for detecting a bus transaction error occurring on an electrical communications bus comprising:

(a) monitoring a bus transaction;

(b) detecting a physical error, a sequential error, and a logical error substantially simultaneously with the bus transaction; and (c) generating an error detection signal in response to the detected bus transaction error.

32. A method for detecting a bus transaction error occurring on an electrical communications bus comprising:

(a) monitoring a bus transaction;

(b) detecting a sequential error and at least one of the group consisting of a physical error, and a logical error; and (c) generating an error detection signal in response to the detected bus transaction error.

33. The method of claim 32, wherein step (b) is performed substantially simultaneously with the bus transaction.

\* \* \* \* \*